Feb. 15, 1966 L. JOHNSON 3,234,695
AIRCRAFT SHELTER

Filed Aug. 6, 1962 2 Sheets-Sheet 1

INVENTOR.
LEE JOHNSON
BY Bosworth, Sessions,
Herstrom & Knowles
ATTORNEYS.

Feb. 15, 1966   L. JOHNSON   3,234,695
AIRCRAFT SHELTER
Filed Aug. 6, 1962   2 Sheets-Sheet 2

INVENTOR.
LEE JOHNSON
BY Bosworth, Sessions,
Herrstrom & Knowles
ATTORNEYS.

United States Patent Office 3,234,695
Patented Feb. 15, 1966

3,234,695
AIRCRAFT SHELTER
Lee Johnson, P.O. Box 569, Rifle, Colo.
Filed Aug. 6, 1962, Ser. No. 215,089
4 Claims. (Cl. 52—64)

This invention relates to shelters for aircraft and particularly to portable, lightweight shelters having a supporting framework and a covering of sheet material or the like for sheltering light fixed wing aircraft.

Upon consideration of the general problem of providing an enclosure into which and from which a fixed wing aircraft may be placed or removed as by rolling on its own wheels, it will be apparent that one of its more troublesome aspects is the necessity for a clear span opening along one side of the enclosure of sufficient length to accommodate the wing span of the aircraft to be enclosed or sheltered. Such a clear span opening generally requires beams or trusses of substantial weight and/or dimensions together with vertical members at the ends of the span sufficient to support the weight of the beam or truss and any overlying structure such as the roof or depending structures such as sliding doors and the like. One of the objects of my invention, therefore, is to provide an enclosure for fixed wing aircraft having an opening along one side thereof sufficient to accommodate the wing span of an aircraft when it is wheeled into or out of the enclosure and which does not require long and heavy beams or trusses. A further object is to provide a shelter for fixed wing aircraft having a framework adapted to be formed of lightweight structural elements of short length relative to the major overall dimensions of the shelter. A further object of this invention is to provide a shelter for fixed wing aircraft that is lightweight enough to be considered portable and formed of elements that may be easily assembled and disassembled for erection at and transportation between various locations. Indeed, the shelter of my invention may be moved a limited distance in an erected position by manpower as well as transported in a disassembled state. A further object of this invention is to provide a shelter for fixed wing aircraft comprising a frame that is self-supporting and whose weight may be supported and sustained at a plurality of well-distributed points.

These and other objects and advantages of this invention will become apparent from the following description of a preferred form thereof, reference being had to the accompanying drawings in which.

Figure 3:
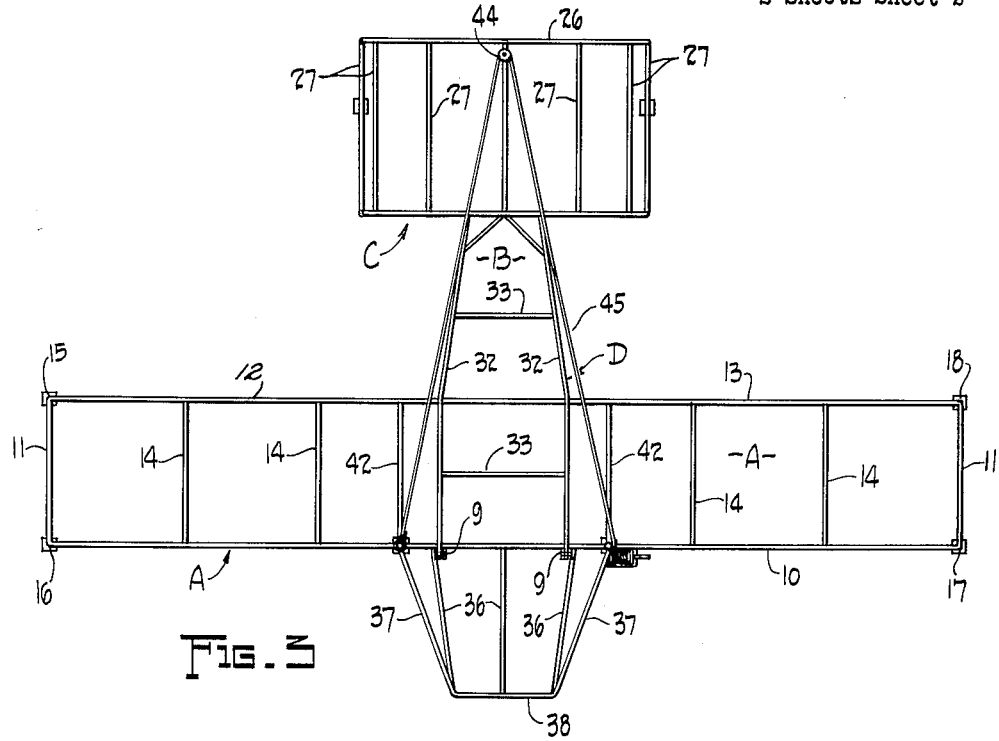
FIGURE 3 is a top view of the aircraft shelter framework.

Briefly, my invention comprehends an aircraft shelter comprising a framework of light tubular elements covered with any suitable lightweight sheet material. The framework may be divided broadly into a stationary and self-supported wing covering portion A and a rear fuselage and tail covering portion B pivotally connected as indicated generally at 9 to wing covering portion A and movable relative thereto. As may be seen in the drawing, wing covering portion A consists of a rectangular upper framework or grid having the general plan outline of an aircraft wing. Wing covering portion A is desirably formed of a forward longitudinal element 10, and transverse elements 11 and rearward longitudinal elements 12 and 13 arranged in substantial axial alignment with each other but with their adjacent ends spaced apart in the region of the central portion of wing covering portion A. Additional transverse elements 14 interconnect longitudinal elements 10 and longitudinal elements 12 and 13 as shown in FIGURE 3.

Figure 2:
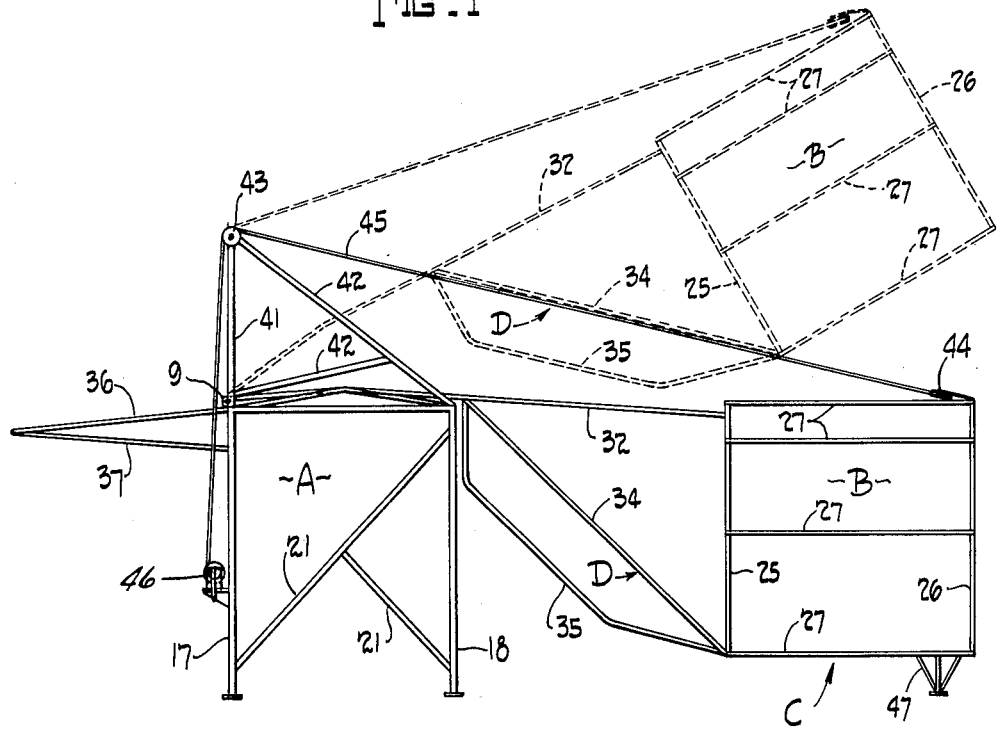
FIGURE 2 is a side elevation view of the framework of the shelter shown in FIGURE 1 and illustrates two positions of the movable portion of the framework.
Figure 4:
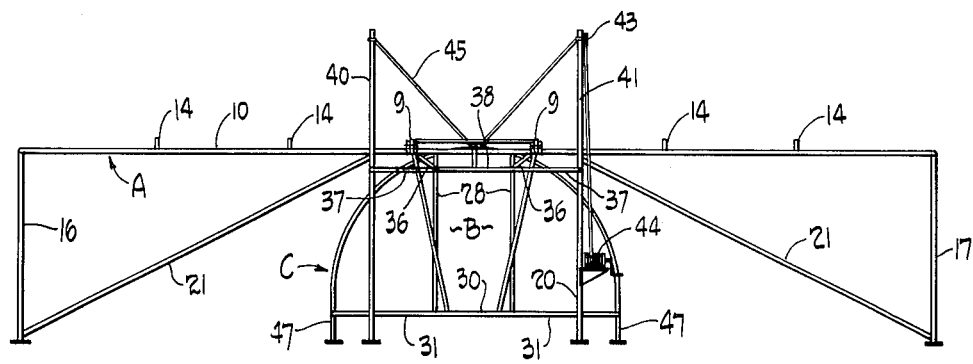
FIGURE 4 is a front elevation view of the framework of the aircraft shelter shown in FIGURE 1.

The upper framework of wing covering portion A described above is supported at its corners by upright members 15, 16, 17 and 18 as well as at additional points along forward longitudinal element 10 by upright members 19 and 20. The forward and end walls of wing covering portion A are preferably braced by inclined elements 21 arranged as shown in FIGURES 2 and 4 or in any other suitable manner. The rearward wall of wing covering portion A is entirely free of structural elements between corner upright members 15 and 18 and between rearward longitudinal members 12 and 13 and the ground or floor upon which the enclosure stands.

Thus, covering portion A is an entirely free-standing and self-supported structure having a plan outline corresponding to the configuration of the wings and that portion of the fuselage therebetween of the aircraft to be sheltered.

Rearward fuselage and tail covering portion B as shown in the drawings may be conveniently subdivided for purposes of description into a tail covering sub-portion C and a fuselage covering sub-portion D though both parts together comprise a single major element of the framework of the enclosure. Tail covering sub-portion C consists of a somewhat barrel-like enclosure having a planar open lower face and is extensive enough to accommodate and enclose the span and height of the empennage of the aircraft to be sheltered. The forward and rearward walls of sub-portion C are preferably defined by circular arch members 25 and 26 held in a laterally spaced apart parallel fashion by longitudinally extending members 27 circumferentially spaced apart about the arches 25 and 26 and attached thereto as by welding. The forward and rearward walls may be further strengthened by vertical elements 28 and 29 in the forward and rearward walls, respectively, and by horizontal element 30 interconnecting the lower and free ends of circular arch element 26 and vertical elements 29. Each vertical element 28 in the forward wall of tail covering sub-portion B is connected to the lower free end of circular arch element 25 adjacent thereto by short horizontal elements 31. Elements 31, lower longitudinal elements 27 and element 30 along the bottom edge of the rearward wall together form a square frame interrupted only at the central portion of the forward wall to provide space to accept that portion of the fuselage immediately forward of the empennage.

Fuselage covering sub-portion D is a tunnel-like structure extending between the forward wall of tail covering sub-portion C and the rearward wall of the self-supporting wing covering portion A. It consists of upper longitudinal elements 32 connected to the upper portions of vertical members 28 in the forward wall of tail covering sub-portion C. Elements 32 are laterally spaced apart by transverse elements 33 about the same distance as the adjacent spaced apart ends of longitudinal elements 12 and 13 in the rearward side of the upper framework of wing covering portion A and extend forwardly in an approximately horizontal plane to and beyond the rearward edge of wing covering portion A to forward longitudinal member 10 where they are pivotally connected as indicated generally at 9 for swinging movement about a horizontal axis parallel to longitudinal element 10. The side walls of fuselage covering sub-portion D are desirably formed of inclined and suitably shaped elements 34 and 35 interconnecting the lower horizontal elements 31 of tail covering sub-portion C and upper horizontal elements 32 of fuselage covering sub-portion D as shown in FIGURE 2 of the drawings.

Figure 1:
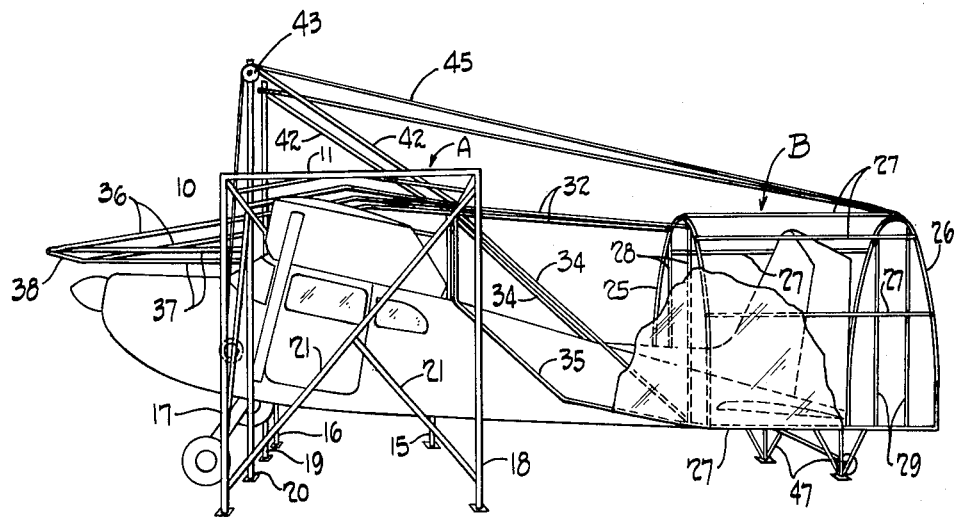
FIGURE 1 is a perspective view of an aircraft shelter embodying my invention and from which substantially all of the sheet material covering has been removed to expose the framework of the shelter and including a representation of a conventional fixed wing aircraft within the shelter framework.

A framework for conveniently supporting a covering material over that portion of the fuselage including the engine extending forwardly of the wing may be provided conveniently by a number of forwardly extending inclined linear elements 36 and horizontal linear elements 37 interconnected at their outward free ends by horizontal and transverse element 38 as shown particularly in FIGURES 1, 2 and 3 of the drawings. The cantilever nose covering portion has been omitted from FIGURE 4 in order to more clearly show the remainder of the aircraft shelter framework.

From the foregoing description of the major wing covering portion A and fuselage and tail covering portion B including its sub-portions C and D, it will become apparent that a framework is provided which conforms generally to the shape or form of a fixed wing aircraft and which will support a sheet material covering above and on all sides of an aircraft to be enclosed. Wing covering portion A is free standing and self supported and has an opening on its rearward side free of structural elements so as to provide a clear span opening extensive enough to accept the wing span of an aircraft. Fuselage and tail covering portion B is pivotally connected to the forward edge of wing covering portion A for rotation about a horizontal axis so that it may be raised as a unit in a substantially vertical direction to a height to permit clearance beneath it for the wing of the aircraft and/or the upper end of the fuselage as shown in broken lines in FIGURE 2. After the aircraft is in place as in FIGURE 1, the fuselage and tail covering portion B is lowered to provide a complete covering framework of enclosure about that portion of the plane aft of the wing.

While the raising and lowering of fuselage and tail covering portion B about its pivotal axis on the forward longitudinal edge of wing covering portion A may be accomplished in any convenient fashion and even raised and held by hand, I prefer to provide and it is one of the features of my invention to employ tension means associated with wing covering portion A to raise and lower the swingably movable fuselage and tail covering portion B. In its preferred form, the lowering and raising mechanism for the fuselage and tail covering portion B comprises a pair of vertical masts 40 and 41 extending upwardly from the forward longitudinal edge of wing covering portion A and suitably braced on their rearward sides by inclined elements 42 leading to and toward the rearward longitudinal edge of wing covering portion A and particularly longitudinal elements 12 and 13 thereof. Masts 40 and 41 are preferably an extension of vertical upright supports 19 and 20, supporting the forward longitudinal element 10 of wing covering portion A. A pulley 43 is provided at the top of mast 41, for example, and a single block 44 is attached to the upper rear portion of fuselage and tail covering portion B. Suitable tension means such as a cable or light stranded steel wire 45 is attached to the upper part of mast 40 and extends back through single block 44 and thence forward and over pulley 43 and down along mast 41 and upright member 20 to a small winch 46 suitably mounted at a convenient height on upright member 20. Thus, by winding up the cable 45 on the drum of winch 46, the fuselage and tail covering portion B is raised in a generally vertical direction and caused to move upwardly about its point of pivotal connection 9 with the forward side of wing covering portion A as the tension element or cable 45 is shortened. Thus, the fuselage and tail covering portion B is raised by tension means acting between its rearward upper side and a point or points vertically spaced above its horizontal axis of rotation and lying in substantially the vertical plane of the forward longitudinal side of wing covering portion A. It will be apparent that because of the self-supported and free-standing nature of wing covering portion A and especially because of corner upright elements 15 and 18 located rearwardly of pivotal connections 9, the fuselage and tail covering portion B may be raised in this manner without any guying on masts 40 and 41 or on wings covering portion A to the ground or other structures.

Employing the means described above for raising and lowering the fuselage and tail covering portion B, it will be apparent that an aircraft can be rolled into the enclosure by winding tension element 45 or winch 46 and raising the rearward movable portion of the enclosure after which the airplane may be rolled forwardly until in a position with its wing beneath wing covering portion A. Thereafter, the tension means or cable 45 may be payed out by unwinding winch means 46 thereby lowering fuselage tail covering portion B down upon and over and around the rearward fuselage and empennage of the aircraft. The aircraft may be removed by the reverse process of raising the fuselage and tail covering portion B, rolling the plane rearwardly out from beneath wing covering portion A to a point clear of fuselage and tail covering portion B after which the latter may be lowered until its feet, such as structures 47, are in contact with and supported by the ground or surface upon which the enclosure stands.

The particular sheet material covering to be employed in enclosing the framework embodying my invention may be a lightweight, flexible woven material, flexible sheet material or even semi-rigid bendable sheet material fastened to the framework in an appropriate manner. Various materials may be employed on different parts of the covering of the framework. For example, the covering extending downwardly from the cantilever nose covering portion can either be made of canvas which may be folded or draped aside to permit easy access to the engine and propeller while the aircraft is within the enclosure. Such coverings or curtains may be staked to the ground when complete protection and enclosure of the aircraft is desired. Similarly, the rearward facing longitudinal wall of wing covering portion A is most conveniently formed of canvas or some woven material which may be pulled up and out of the way when the plane is rolled into or out of the enclosure. The upper framework of wing covering portion A and the tail covering portion may be conveniently covered with fixed and more permanently attached sheet material such as light gauge aluminum.

The particular means for and manner of fastening together the several linear and formed elements comprising the framework as shown form no part of this invention. Conventional means such as welding may be employed. It will be obvious that the framework is well adapted to and may be permanently joined as by welding at some points and detachably fastened together at others to facilitate and permit the disassembly of the framework into a more compact form for transportation to a new or different site. In the particular form of my invention shown and described above, I have successfully employed two inch pipe welded together in fabricating wing covering portion A and one-half inch conduit welded together in fabricating fuselage and tail covering portion B.

While I have shown and described a preferred embodiment of my invention and particularly described the various linear and formed elements comprising such a framework, it is to be understood that my invention comprehends an aircraft shelter having a free-standing and self-supporting wing covering portion and a rearward fuselage and tail covering portion pivotally connected to the wing covering portion for movement in a generally vertical direction and about a horizontal axis spaced forwardly of the rearward longitudinal edge and preferably adjacent to the forward longitudinal edge of the wing covering portion even though such portions or assemblies may be fabricated and formed of elements, pipes, conduits or the like arranged together in a different fashion than that precisely shown in the drawings and described above. I prefer to also employ tension means to raise and lower the fuselage and tail covering portion and acting between a point or points vertically spaced above the horizontal axis of rotation of the rearward fuselage and tail covering portion and the rearward end of said latter portion.

It will also be apparent, of course, that changes may be made in the general plan outline and configuration of the supporting framework of an aircraft shelter embodying my invention in order to accommodate aircraft of different sizes and somewhat different configurations. For example, low wing aircraft may be easily accommodated in the shelter I have shown and described or in a shelter whose wing covering portion is not necessarily as high as that required for high wing aircraft. Also, aircraft tricycle landing gear, as well as the type of landing gear shown on the aircraft in FIGURE 1, may be accommodated in shelters embodying my invention merely by providing the necessary vertical height in the fuselage and tail covering portion of the structure.

Changes, modifications and improvements may be made to the above-described preferred and modified forms of my invention without departing from the precepts and principles of the invention. Therefore, I do not wish my patent to be limited to any particular form of my invention specifically illustrated and described nor in any manner inconsistent with the extend to which my invention has promoted the art.

I claim:
1. An aircraft shelter comprising
   a fixed free-standing wing covering portion having a plurality of ground-engaging supporting elements,
      said fixed free-standing portion including an open side having a horizontally extending and vertically elevated open clear span defining an aircraft entrance to the aircraft shelter, a closed side opposite and laterally spaced from the clear span, the open and closed sides having upper portions longitudinally coextensive with the clear span, and an upper wing covering side extending laterally between the upper portions of said open and said closed sides,
   a movable portion
      having a lowered position and a raised position and extending generally outwardly from the clear span open side when in its lowered position and generally outwardly and upwardly from the clear span open side when in its raised position,
      said movable portion including a part having top and side for enclosing the empennage of the aircraft,
      said movable portion also including rigid means extending from said top part and pivotally secured to the free-standing portion to swing about a fixed horizontal axis spaced forwardly of said clear span open side and adjacent to the upper portion of said closed side,
         whereby the movable portion is swingable in a vertical plane between a lowered position in which the sides of the empennage enclosing part are generally below the upper portion of the open clear span and a raised position in which such sides are wholly above said portion.

2. The aircraft shelter according to claim 1 in which said fixed horizontal axis is substantially vertically aligned with the closed side of said free-standing portion and substantially horizontally aligned with the upper portion of the open clear span.

3. The aircraft shelter according to claim 2 together with tension means interconnected and acting between a point on said movable portion horizontally spaced from said fixed horizontal axis and another point on said free-standing portion generally vertically aligned with the closed side thereof and vertically spaced above the horizontal axis, and means for adjusting the length of said tension means interconnecting said points.

4. An aircraft shelter having a T plan and comprising
   a fixed free-standing wing covering portion corresponding to the cross bar portion of the T plan and having a plurality of ground-engaging supporting elements, said fixed free-standing portion including an open side facing the stem portion of the T plan and a closed side laterally opposite and spaced from the open side, both sides carrying said ground-engaging elements, said open side having a horizontally extending and vertically elevated open clear span defining an aircraft entrance to the aircraft shelter, and a vertically elevated upper wing covering side extending laterally between the uppermost portions of said open and closed sides,
   a movable tail covering portion corresponding to the stem portion of the T plan having a raised and a lowered position and extending outwardly from the clear span open side of said free-standing portion when in its lowered position and outwardly and upwardly when in its raised position, said movable portion including a part having top and sides for enclosing the empennage of the aircraft and rigid means reaching from said empennage enclosing part of said movable portion approximately at the uppermost level of said clear span toward said open side of said free-standing portion and continuing beyond said open side to a portion of said closed side of said free-standing portion, said rigid means being pivotally secured to the free-standing portion of the shelter at the uppermost portion of said closed side to swing about a fixed horizontal axis lying substantially in a plane of said pivotally connected closed side portion,
   whereby the movable portion is swingable in a vertical plane between its lowered position in which sides of the empennage enclosing part are generally below the uppermost portion of the open clear span and a raised position in which said sides are wholly above said portion.

References Cited by the Examiner
UNITED STATES PATENTS

| 1,648,160 | 11/1927 | Boedecker | 43—62 |
| 2,759,226 | 8/1956 | McKee et al. | 20—16 |

FOREIGN PATENTS

| 777,836 | 12/1936 | France. |
| 60,931 | 6/1926 | Sweden. |

FRANK L. ABBOTT, *Primary Examiner.*

RICHARD W. COOKE, Jr., *Examiner.*